United States Patent
Severac et al.

(10) Patent No.: US 9,029,471 B2
(45) Date of Patent: May 12, 2015

(54) FLUOROPOLYMER

(75) Inventors: Romain Severac, Moisson (FR); Agnes Ibos, Levallois-Peret (FR); Lamia Heuze, Bonnieres sur Seine (FR); Renaud Laloux-Walther, Neauphle le Chateau (FR)

(73) Assignee: E I du Pont du Nemours and Company, Wilmington, DE (US)

( * ) Notice: Subject to any disclaimer, the term of this patent is extended or adjusted under 35 U.S.C. 154(b) by 731 days.

(21) Appl. No.: 12/679,039

(22) PCT Filed: Sep. 30, 2008

(86) PCT No.: PCT/US2008/078289
§ 371 (c)(1),
(2), (4) Date: Jul. 7, 2010

(87) PCT Pub. No.: WO2009/046016
PCT Pub. Date: Apr. 9, 2009

(65) Prior Publication Data
US 2010/0288962 A1  Nov. 18, 2010

(51) Int. Cl.
C14C 9/00 (2006.01)
C08F 220/36 (2006.01)
C08F 220/24 (2006.01)
C08F 220/68 (2006.01)

(52) U.S. Cl.
CPC ............... C14C 9/00 (2013.01); C08F 220/36 (2013.01); C08F 220/24 (2013.01); C08F 220/68 (2013.01)

(58) Field of Classification Search
CPC .................................................. C08F 220/68
USPC .................. 526/243, 245, 248; 560/222, 223
See application file for complete search history.

(56) References Cited

U.S. PATENT DOCUMENTS

| | | | |
|---|---|---|---|
| 2,803,615 A | 8/1957 | Ahlbrecht et al. | |
| 3,256,231 A | 6/1966 | Johnson, Jr. et al. | |
| 3,532,659 A | 10/1970 | Hager et al. | |
| 4,032,495 A | 6/1977 | Perronin et al. | |
| 4,366,299 A | 12/1982 | Dessaint | |
| 4,778,915 A | 10/1988 | Lina et al. | |
| 4,795,793 A * | 1/1989 | Amimoto et al. | 526/243 |
| 5,055,538 A * | 10/1991 | Amimoto et al. | 526/245 |
| 5,124,181 A | 6/1992 | Schaffer et al. | |
| 5,316,860 A | 5/1994 | Stewart et al. | |
| 5,439,989 A | 8/1995 | Morton et al. | |
| 5,439,998 A * | 8/1995 | Lina et al. | 526/243 |
| 5,534,604 A | 7/1996 | Bildhauer et al. | |
| 5,725,789 A | 3/1998 | Huber et al. | |
| 5,741,434 A | 4/1998 | Ritter et al. | |
| 6,294,103 B1 | 9/2001 | Coppens | |
| 6,365,769 B1 | 4/2002 | Behr et al. | |
| 6,380,336 B1 * | 4/2002 | Soane et al. | 526/245 |
| 6,716,944 B2 * | 4/2004 | Maekawa et al. | 526/245 |
| 6,774,176 B1 | 8/2004 | Nzudie et al. | |
| 7,049,379 B2 * | 5/2006 | Jariwala et al. | 526/243 |
| 7,196,133 B2 * | 3/2007 | Hosoda et al. | 524/545 |
| 8,609,795 B2 * | 12/2013 | Sugimoto et al. | 526/245 |
| 8,653,213 B2 * | 2/2014 | Brown | 526/245 |
| 2002/0033468 A1 | 3/2002 | Huang | |
| 2003/0204015 A1 * | 10/2003 | Burleigh et al. | 524/589 |
| 2005/0027063 A1 | 2/2005 | Audenaert et al. | |
| 2006/0205864 A1 * | 9/2006 | Yamamoto et al. | 524/544 |
| 2007/0166475 A1 * | 7/2007 | Fournier et al. | 427/412 |
| 2009/0111344 A1 * | 4/2009 | Murphy et al. | 442/80 |
| 2010/0168318 A1 | 7/2010 | Several et al. | |

FOREIGN PATENT DOCUMENTS

| | | |
|---|---|---|
| DE | 2660200 B1 | 7/1976 |
| EP | 195714 B1 | 12/1988 |
| EP | 426530 B1 | 6/1994 |
| EP | 693504 A1 | 1/1996 |
| EP | 1333067 B1 | 7/2005 |
| EP | 1201815 B1 | 4/2006 |
| EP | 736768 B1 | 10/2008 |
| FR | 2319668 A1 | 2/1997 |
| GB | 1298291 A | 11/1972 |
| GB | 1543084 | 7/1976 |
| WO | WO 2004035708 A1 * | 4/2004 |
| WO | WO 2008089391 A1 * | 7/2008 |

OTHER PUBLICATIONS

Grubbs, et al., "One-step synthesis of alkoxyamines for nitroxide-mediated radical polymerization", Chem.Commun., 2005, 80-82, The Royal Society of Chemistry.
Chapon, et al., Automated Parallel Synthesis of MADIX (Co)Polymers, Macromol, Rapid Commun, 2003, 24, 87-91.

* cited by examiner

Primary Examiner — Nicole M Buie-Hatcher

(57) ABSTRACT

Various fluoropolymers have been proposed for imparting oil and water repellency to leather. Commonly, these fluoropolymers are amphiphilic; i.e., they are made from at least one monomer which is hydrophobic and at least one monomer which is hydrophilic. The present invention identifies and remedies disadvantages associated with the ability of amphiphilic fluoropolymers to impart oil and water repellency to leather. Contrary to conventional thinking, it has now been discovered that the incorporation of hydrophilic groups in a fluoropolymer undesirably reduces its ability to impart water resistance to leather. Correspondingly, it has also been discovered that a fluoropolymer incorporating fewer or no hydrophilic groups imparts superior oil and water repellency to leather when compared to fluoropolymers incorporating more hydrophilic groups. Therefore, this invention provides fluoropolymers which incorporate reduced levels of hydrophilic groups.

7 Claims, No Drawings

FLUOROPOLYMER

FIELD OF THE INVENTION

This invention relates to a fluoropolymer, the manufacture thereof, and the use thereof for imparting oil and water repellency to leather substrates. In particular, the fluoropolymer of this invention is made from monomers having very few or no hydrophilic groups.

BACKGROUND OF THE INVENTION

Various fluoropolymers have been proposed for imparting oil and water repellency to leather. Commonly, these fluoropolymers are amphiphilic; i.e., they are made from at least one monomer which is hydrophobic and at least one monomer which is hydrophilic. The present invention identifies and remedies disadvantages associated with the ability of amphiphilic fluoropolymers to impart oil and water repellency to leather.

Proposals of amphiphilic fluoropolymers for imparting oil and water repellency are summarized herein and include U.S. Pat. No. 5,316,860 which discloses amphiphilic copolymers for improving the strength, temper, and water resistance of the leather. The amphiphilic copolymers are formed from a predominant amount of at least one hydrophobic monomer and a minor amount of at least one copolymerizable hydrophilic monomer. U.S. Pat. No. 5,534,604 discloses copolymers comprising ethylenically unsaturated dicarboxylic acid anhydrides, long chain olefins and fluoroolefin. U.S. Pat. No. 5,124,181 discloses copolymers polymerized from (a) alkyl methacrylates, vinyl esters of carboxylic acids or mixtures thereof and (b) monoethylenically unsaturated carboxylic acids, monoethylenically unsaturated dicarboxylic anhydrides, monoesters or monoamides of monoethylenically unsaturated dicarboxylic acids, amides of monocarboxylic acids. U.S. Pat. No. 5,741,434 discloses water-dispersible and/or water-emulsifiable co-oligomers containing (a) fatty crotonates; (b) radically copolymerizable, hydrophilic, ethylenically unsaturated acids and/or their anhydrides; and possibly (c) minor amounts of other copolymerizable comonomers.

Use of the aforementioned amphiphilic copolymers appears to be predicated on the belief that the hydrophilic portion (typically a carboxylic acid group) of these copolymers is necessary for imparting water resistance to leather. An expression of this conventional thinking may be found in U.S. Pat. No. 6,294,103 which advises: "if the carboxylic acid content is low the copolymer may not adequately penetrate the leather structure and/or may not bind sufficiently into the leather."

BRIEF SUMMARY OF THE INVENTION

Contrary to conventional thinking, it has now been discovered that the incorporation of hydrophilic groups in a fluoropolymer undesirably reduces its ability to impart water resistance to leather. Correspondingly, it has also been discovered that a fluoropolymer incorporating fewer or no hydrophilic groups imparts superior oil and water repellency to leather when compared to fluoropolymers incorporating more hydrophilic groups.

Therefore, this invention provides fluoropolymers which incorporate reduced levels of hydrophilic groups. Preferably, the fluoropolymers of the invention are produced from monomers comprising hydrophobic monomers and no more than 5 weight percent of any hydrophilic monomer, preferably no more than 3.5 weight percent, and more preferably no more than 1 weight percent. Most preferably, the fluoropolymers of the invention are produced from monomers comprising only hydrophobic monomers and absent of any hydrophilic monomers.

The fluoropolymers of the invention are produced from monomers comprising at least one hydrophobic fluorinated acrylate and at least one hydrophobic vinyl compound such an alkyl acrylate, acrylamide, or styrene. When used herein, the term "acrylate" may include acrylate or methacrylate. When used herein, the term "acrylamide" may include acrylamide or methacrylamide. Preferably, the fluoropolymer is produced from a monomer mixture predominately comprising a fluorinated acrylate and a vinyl compound wherein the amount of any other hydrophobic monomer present is less than 20 weight percent, more preferably less than 10 weight percent, even more preferably less than 5 weight percent, and still even more preferably less that 1 weight percent. Most preferably, the fluoropolymer is produced from a monomer mixture comprising a fluorinated acrylate monomer, a vinyl compound monomer, and is absent of any other hydrophobic monomer. The amount of fluorinated acrylate monomer in the monomer mixture is preferably at least 20 weight percent, more preferably at least 30 weight percent, and most preferably at least 40 weight percent. The preferable amount of vinyl compound in the monomer mixture is at least 20 weight percent, more preferably at least 30 weight percent, and most preferably at least 35 weight percent.

The acrylate monomer used to make the fluoropolymer in the invention is represented by the following:

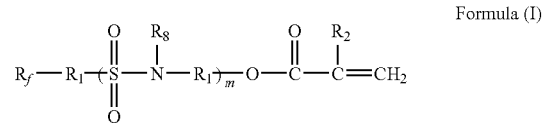

Formula (I)

wherein $R_f$ represents a perfluorinated alkyl group, optionally interrupted by oxygen, having at least 2 carbon atoms and preferably having 6 or fewer carbon atoms; each $R_1$ is independently chosen from a $C_1$-$C_{20}$ hydrocarbylene, preferably $C_1$-$C_5$, more preferably linear, and even more preferably ethyl; $R_8$ is chosen from a $C_1$-$C_{20}$ hydrocarbyl or hydrogen, preferably $C_1$-$C_5$, preferably linear, and more preferably hydrogen or methyl; $R_2$ is chosen from hydrogen, fluorine, or a $C_1$-$C_4$ alkyl and is preferably hydrogen or methyl; m is 0 or 1, preferably 1.

The vinyl compound monomer used to make the fluoropolymer in the invention is represented by the following:

Formula (II)

wherein $R_h$ represents a linear or branched hydrocarbon group having at least 4 carbon atoms; each Z is divalent and independently selected from the group consisting of —OC(O)—, —HNC(O)—, and —$C_6H_4$—, preferably —OC(O)—; and $R_3$ is chosen from hydrogen or a $C_1$-$C_4$ alkyl group and is preferably hydrogen or methyl.

Addition polymerization (e.g., free radical polymerization) using a monomer mixture comprising the aforementioned fluorinated acrylate (I) and vinyl compound (II) is conducted under conditions to produce the fluoropolymers of the invention. The polymerization process of the invention can be enabled with a free radical initiator and an optional chain transfer agent both of which are preferably absent of any fluorine atoms. The polymerization may be conducted in a homogeneous or heterogeneous medium resulting in fluoropolymers of the invention comprising hydrophobic fluorinated acrylic units, hydrophobic vinylic units, and optionally other monomeric units said fluoropolymer represented by the following:

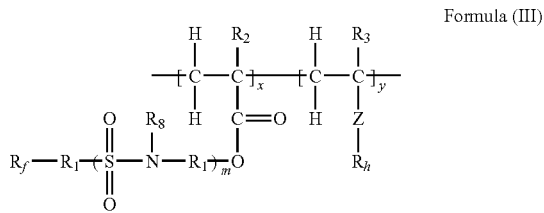

Formula (III)

wherein x is a non-zero positive integer denoting the number of hydrophobic fluorinated acrylic units; y is a non-zero positive integer denoting the number of hydrophobic vinylic units; the ratio of x:y is preferably from 2:8 to 8:2, more preferably from 3:7 to 7:3, and most preferably from 4:6 to 6:4; the sum of x and y is at least 21; each $R_f$ independently represents a perfluorinated alkyl group, optionally interrupted by oxygen, having at least 2 carbon atoms and preferably having 6 or fewer carbon atoms; each $R_1$ is independently chosen from a $C_1$-$C_{20}$ hydrocarbylene, preferably $C_1$-$C_5$, more preferably linear, and even more preferably ethyl; each $R_8$ is independently chosen from a $C_1$-$C_{20}$ hydrocarbyl or hydrogen, preferably $C_1$-$C_5$, preferably linear, and more preferably hydrogen or methyl; each $R_2$ is independently chosen from hydrogen, fluorine, or a $C_1$-$C_4$ alkyl and is preferably hydrogen or methyl; each m is independently 0 or 1, preferably 1; each $R_h$ independently represents a linear or branched hydrocarbon group having at least 4 carbon atoms; each Z is divalent and independently selected from the group consisting of —OC(O)—, —HNC(O)—, and —$C_6H_4$—, preferably —OC(O)—; and each $R_3$ is independently chosen from hydrogen or a $C_1$-$C_4$ alkyl group and is preferably hydrogen or methyl.

Referring to Formula III, the fluoropolymer of the invention comprises no more than 5 weight percent of any monomeric units which are hydrophilic, preferably no more than 3.5 weight percent, and more preferably no more than 1 weight percent. Most preferably, the fluorocopolymer of the invention comprises no monomeric units which are hydrophilic. Other than fluorinated acrylic units and vinylic units, the fluoropolymers of the invention preferably comprise no more than 10 weight percent of any monomeric units which are hydrophobic, more preferably no more than 5 weight percent, and still more preferably no more than 1 weight percent. Preferably, at least 20 weight percent of the fluoropolymer of the invention is composed of fluorinated acrylic units, more preferably at least 30 weight percent, and most preferably at least 40 weight percent. Preferably, at least 20 weight percent of the fluoropolymer of the invention is composed of vinylic units, more preferably at least 30 weight percent, and most preferably at least 35.

When applied to leather, the fluoropolymers of the invention provide superior oil and water repellency compared to fluoropolymers incorporating higher amounts of hydrophilic groups. Application to leather can be performed by core (drum application) or surface (spray application) treatments.

Another advantage of the invention relates to fluoropolymers which incorporate perfluoroalkyl chains ($R_f$) having no more than six carbon atoms. Higher levels of fluorine incorporation in a fluoropolymer are thought to impart higher water repellency which may explain why conventional fluoropolymers typically have eight or more carbon atoms in their perfluoroalkyl chains. The reduction of the length of the $R_f$ chain in the invention represents economic savings attributable to the lowered expense of fluorine incorporation. Although the fluoropolymers of the invention have lower levels of incorporated fluorine, they are still able to impart adequate or superior water repellency thereby delivering the same or better performance at lower cost; i.e., better "fluorine efficiency."

DETAILED DESCRIPTION OF THE INVENTION

The fluoropolymer of the invention is made by conducting free radical polymerization using hydrophobic monomers comprising a fluorinated acrylate monomer of Formula (I) and a vinyl compound of Formula (II) as follows:

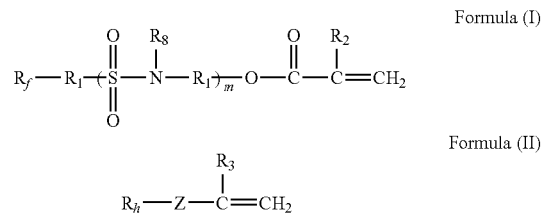

Formula (I)

Formula (II)

wherein $R_f$ represents a perfluorinated alkyl group, optionally interrupted by oxygen, having at least 2 carbon atoms and preferably having 6 or fewer carbon atoms; each $R_1$ is independently chosen from a $C_1$-$C_{20}$ hydrocarbylene, preferably $C_1$-$C_5$, more preferably linear, and even more preferably ethyl; $R_8$ is chosen from a $C_1$-$C_{20}$ hydrocarbyl or hydrogen, preferably $C_1$-$C_5$, preferably linear, and more preferably hydrogen or methyl; $R_2$ is chosen from hydrogen, fluorine, or a $C_1$-$C_4$ alkyl and is preferably hydrogen or methyl; m is 0 or 1, preferably 1; $R_h$ represents a linear or branched hydrocarbon group having at least 4 carbon atoms; each Z is divalent and independently selected from the group consisting of —OC(O)—, —HNC(O)—, and —$C_6H_4$—, preferably —OC(O)—; and $R_3$ is chosen from hydrogen or a $C_1$-$C_4$ alkyl group and is preferably hydrogen or methyl.

Examples of suitable fluorinated acrylate monomers of Formula (I) wherein s=0 are disclosed in U.S. Pat. Nos. 4,174,851, 2,642,416, 3,384,627, 3,392,046, 3,282,905, 3,532,659, 3,102,103, all of which are hereby incorporated by reference to the extent permitted by applicable law. Specific examples of suitable fluorinated acrylate monomers of Formula (1) wherein s=0 include perfluorobutylethyl acrylate, perfluorohexylethyl acrylate, perfluorobutylethyl methacrylate, and perfluorohexylethyl methacrylate. Examples of suitable fluorinated acrylate monomers of Formula (1) wherein s=1 are disclosed in U.S. Pat. No. 5,439,998 which is hereby incorporated by reference to the extent permitted by applicable law. Specific examples of suitable fluorinated acrylate monomers of Formula (1) wherein s=1 include 2-[methyl[(3,3,4,4,5,5,6,6,7,7,8,8,8-tridecafluorooctyl)sulfonyl]amino]ethyl acrylate; 2-[methyl[(3,3,4,4,5,5,6,6,6-nonafluorohexyl)sulfonyl]amino]ethyl acrylate; 2-[methyl[(2,2,3,3,4,4,5,5,6,6,7,7-tridecafluoroheptyl)sulfonyl]amino]ethyl acrylate; 2-[methyl[(3,3,4,4,5,5,6,6,7,7,8,8,8-tridecafluorooctyl)sulfonyl]amino]ethyl methacrylate; [methyl[(3,3,4,4,5,5,6,6,6-nonafluorohexyl)sulfonyl]amino]ethyl methacrylate; and 2-[methyl[(2,2,3,3,4,4,5,5,6,6,7,7,7-tridecafluoroheptyl)sulfonyl]amino]ethyl methacrylate.

Examples of suitable vinyl compounds of Formula (II) useful in the invention wherein Z is —OC(O)— are acrylates including long chain $C_8$ to $C_{40}$ alkyl acrylates, $C_8$ to $C_{40}$ alkyl methacrylates, and mixtures thereof. Examples of suitable compounds of this type are 2-ethylhexyl acrylate, n-decyl acrylate, dodecyl acrylate, isotridecyl acrylate, tetradecyl acrylate, $C_{16}$ to $C_{18}$ tallow fatty alcohol acrylate, octadecyl acrylate, palrityl acrylate, n-eicosyl acrylate, and mixtures thereof. Also suitable are mixtures of long chain alkyl acrylates. Preferable acrylates are acrylic and methacrylic esters derived from alcohols of 4 to 28 carbon atoms. Examples of suitable vinyl compounds of Formula (II) useful in the invention wherein Z is —HNC(O)— are acrylamides including n-decyl-2-propenamide, n-octadecyl-2-propenamide, n-dodecyl-2-propenamide, n-hexadecylmethacrylamide, n-decylmethacrylamide, n-stearylmethacrylamide, and n-dodecylmethacrylamide, and mixtures thereof. Examples of suitable vinyl compounds of Formula (II) useful in the invention wherein Z is —$C_6H_4$— are syrenic compounds including p-dodecylstyrene, 4-octylstyrene, p-pentylstyrene, and p-dexylstyrene, and mixtures thereof.

Preferably, the fluoropolymer is produced from monomers predominately comprising the aforementioned fluorinated acrylate and vinyl compound wherein the amount of any other hydrophobic monomer present is less than 20 weight percent, more preferably less than 10 weight percent, even more preferably less than 5 weight percent, and still even more preferably less that 1 weight percent.

While not wishing to be bound by any particular theory, it is thought that the ability of fluoropolymers of this invention to impart improved oil and water repellency is attributable, at least in part, from being made with monomers having the terminal perfluorinated $R_f$ chain possessed by incorporated fluorinated acrylate monomers of Formula (I). Accordingly, a sufficient amount of fluorinated acrylate monomer should be present such that fluoropolymers made therefrom impart acceptable water and oil resistance to leather. The amount of fluorinated acrylate monomer in the monomers used to make the fluoropolymer is preferably at least 20 weight percent, preferably at least 30 weight percent, and most preferably at least 40 weight percent.

The use of vinyl compound monomers is necessary to endow fluoropolymers made therefrom with the ability to lubricate and thereby impart acceptable suppleness to leather. While not wishing to be bound by any particular theory, it is thought the ability of fluoropolymers of this invention to impart lubricity and suppleness is attributable, at least in part, to incorporation of monomers having terminal $R_h$ chains possessed by vinyl compounds of Formula (II) wherein the $R_h$ chains undergo London dispersion force interactions with the leather substrate including chemicals therein which were applied during tanning. Accordingly, a sufficient amount of vinyl compound should be present such that fluoropolymers made therefrom impart acceptable lubricity and suppleness to leather. The preferable amount of vinyl compound in the monomer mixture used to make the fluoropolymer is at least 20 weight percent, preferably at least 30 weight percent, and most preferably at least 35 weight percent.

Because it has now been discovered that the incorporation of too many hydrophilic groups in a fluoropolymer undesirably reduces its ability to impart water and oil resistance to leather, the monomers used to make the fluoropolymers of the invention should comprise no more than 2.5 weight percent of any hydrophilic monomer, preferably no more than 1 weight percent, more preferably no more than 0.5 weight percent. Most preferably, the fluoropolymer of the invention is produced from monomers comprising only hydrophobic monomers absent any hydrophilic monomers. Hydrophobic monomers are generally defined as compounds which do not have the ability to form hydrogen bonds with water and do not readily dissolve in or absorb water. Hydrophilic monomers which should be minimized or absent from monomers used to make the fluoropolymers of the invention are exemplified in U.S. Pat. Nos. 5,316,860; 5,534,604; 5,124,181; 5,741,434; and 6,294,103. Specific examples of hydrophilic monomers include anhydrides, carboxylic acids, alcohols, and salts thereof.

It should be noted that residues from free radical initiators and optional chain transfer agents can be incorporated in the fluoropolymers of the invention. It should be understood that the term "monomer" or "monomeric unit" used herein does not include free radical initiators, optional chain transfer agents or the residues therefrom.

The fluoropolymers of the invention comprise hydrophobic fluorinated acrylic units, hydrophobic vinylic units, and optionally other monomeric units said fluoropolymer represented by the following:

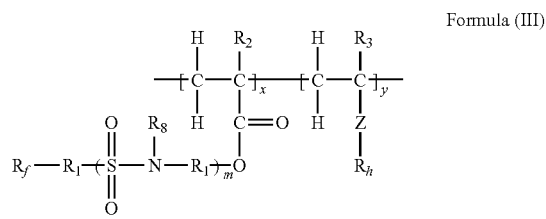

Formula (III)

wherein x is a non-zero positive integer denoting the number of hydrophobic fluorinated acrylic units; y is a non-zero positive integer denoting the number of hydrophobic vinylic units; the sum of x and y is at least 21; each $R_f$ independently represents a perfluorinated alkyl group, optionally interrupted by oxygen, having at least 2 carbon atoms and preferably having 6 or fewer carbon atoms; each $R_1$ is independently chosen from a $C_1$-$C_{20}$ hydrocarbylene, preferably $C_1$-$C_5$, more preferably linear, and even more preferably ethyl; each $R_8$ is independently chosen from a $C_1$-$C_{20}$ hydrocarbyl or hydrogen, preferably $C_1$-$C_5$, preferably linear, and more preferably hydrogen or methyl; each $R_2$ is independently chosen from hydrogen, fluorine, or a $C_1$-$C_4$ alkyl and is preferably hydrogen or methyl; each m is independently 0 or 1, preferably 1; each $R_h$ independently represents a linear or branched hydrocarbon group having at least 4 carbon atoms; each Z is divalent and independently selected from the group consisting of —OC(O)—, —HNC(O)—, and —$C_6H_4$—, preferably —OC(O)—; and each $R_3$ is independently chosen from hydrogen or a $C_1$-$C_4$ alkyl group and is preferably hydrogen or methyl.

The ratio of x:y may be determined by balancing the water and oil resistance thought to be provided by terminal $R_f$ groups with the lubricity and suppleness thought to be provided by terminal $R_h$ groups. Accordingly, and the ratio of x:y is preferably from 2:8 to 8:2, more preferably from 3:7 to 7:3, and most preferably from 4:6 to 6:4.

Referring to Formula III, the fluoropolymer of the invention comprises no more than 5 weight percent of any monomeric units which are hydrophilic, preferably no more than 3.5 weight percent, and more preferably no more than 1 weight percent. Incorporation of high amounts of hydrophilic monomeric units have been discovered to detrimentally affect the resulting fluoropolymer's ability to impart oil and water repellency.

Accordingly, the fluorocopolymer of the invention most preferably comprises no monomeric units which are hydrophilic. Examples of monomeric units which are hydrophilic include those that have the following groups: anhydrides, carboxylic acids, alcohols, and salts thereof. Other than fluorinated acrylic units and vinylic units, the fluoropolymers of the invention preferably comprise no more than 10 weight percent of any monomeric units which are hydrophobic, more preferably no more than 5 weight percent, and still more preferably no more than 1 weight percent.

As discussed earlier, it is believed that the terminal $R_f$ chain in the fluorinated acrylic units improves the ability of the fluoropolymer to impart oil and water repellency. Accordingly, at least 20 weight percent of the fluoropolymer of the invention is preferably composed of fluorinated acrylic units, more preferably at least 30 weight percent, and most preferably at least 40 weight percent. As discussed earlier, it is believed that the terminal $R_h$ chain in the vinylic units improves the ability of the fluoropolymer to impart lubricity and suppleness to leather. Accordingly, at least 20 weight percent of the fluoropolymer of the invention is preferably composed of vinylic units, more preferably at least 30 weight percent, and most preferably at least 35.

As described herein, the molecular weight of the fluoropolymers of the invention can be controlled by use of a chain transfer agent and is preferably at least 10,000 grams/mole. The molecular weight can be chosen depending upon the final use of the fluoropolymer. If the fluoropolymer is delivered in an organic solvent intended for use in a spray application, a high molecular weight is chosen; e.g., greater than about 50,000 grams/mole. If the fluoropolymer is delivered in an aqueous dispersion or emulsion intended for use in a spray or drum application, a medium molecular weight is chosen; e.g., from about 10,000 to about 50,000 grams/mole.

One advantage of using the fluoropolymers of the invention for treatment of leather is their increased fluorine efficiency; i.e., the fluoropolymers of the invention are able to impart water and oil repellency while incorporating less fluorine. Conventional fluoropolymers typically require perfluoroalkyl chains having eight or more carbon atoms to achieve an adequate ability to impart water and oil repellency to leather. In advantageous contrast, the fluoropolymers of the invention only require perfluoroalkyl chains (denoted as $R_f$ in Formulae I and III) having six or fewer carbon atoms to achieve an adequate ability to impart water and oil repellency to leather. A short $R_f$ perfluorinated alkyl chain results in lower incorporated levels of costly fluorine. Despite the short $R_f$ chain, the fluoropolymers of the invention effectively impart water and oil repellency to leather.

In a preferred embodiment of the invention, a mixture of monomers comprising a fluorinated acrylate monomer of Formula (I) and a vinyl compound of Formula (II) is dissolved in an organic solvent thereby producing an monomer mixture which be used in a solution polymerization (optionally followed by dispersion in water) or emulsion polymerization.

During solution polymerization, free radical polymerization of monomers comprising a fluorinated acrylate of Formula (I) and a vinyl compound of Formula (II) is conducted by dissolving the monomers, free radical initiator, and chain transfer agent in an organic solvent. The solution is then heated and maintained at about 40 to 100° C., more preferably about 55 to 90° C., and allowed to react under inert conditions for a period of time to obtain at least 95 percent yield of polymer. Polymer yield may be determined by measuring the amount of residual monomer by gas chromatography. The concentration of monomers in the organic solvent is preferably from 30 to 70 weight percent. Initiator is preferably added in an amount of 0.01 to 2 molar percentage of total monomers. Chain transfer agent(s) can be added in an amount to yield a polymer with a desirable targeted molecular weight which can be determined by summing the weight of monomers in grams, dividing this sum by the total moles of chain transfer agent(s) used, and then adding to this quotient the weighted average of the molecular weight of the chain transfer agent(s) used.

Examples of free radical initiators useful during solution polymerization include: azo compounds, such as azobisisobutyronitrile and azo-2-cyanovaleric acid; hydroperoxides, such as cumene, t-butyl and t-amyl hydroperoxide; dialkyl peroxides, such as di-t-butyl and dicumylperoxide; peroxyesters, such as t-butylperbenzoate and di-t-butylperoxy phthalate; and diacylperoxides, such as benzoyl peroxide and lauryl peroxide.

Examples of chain transfer agents useful during solution polymerization include n-dodecyl mercaptan, mercaptoethanol, mercaptoacetic acid, stearylmercaptane, tert-dodecylmercaptane, trichloromethane, diethyl phosphate, methanol, and mixtures thereof. Examples of suitable organic solvents include: acetates, such as ethyl acetate, butyl acetate, and isopropyl acetate; alcohols, such as 2-methylpropan-2-ol, isopropanol, 2-methoxypropan-2-ol; and ketones, such as acetone, methylisobutyl ketone, and methylethyl ketone, such as n-methyl-2-pyrrolidone, and mixtures thereof.

By using the solution polymerization process described in the invention, an organic solution of fluoropolymers is obtained which is useful for treating leather substrates by spray application. The fluoropolymers of the present invention can also take the form of an aqueous fluoropolymer dispersion which can be made by mechanically mixing (e.g., with a homogenizer) water, at least one surfactant, and an organic solution of fluoropolymers made by the aforementioned solution polymerization process. Aqueous fluoropolymer dispersions of the invention are useful for treating leather substrates by spray and drum application.

An alternative method for making the aqueous fluoropolymer dispersions of the invention involves emulsion polymerization wherein free radical polymerization of monomers comprising a fluorinated acrylate monomer of Formula (I) and a vinyl compound of Formula (II) is conducted by reacting a mixture comprising the monomers, free radical initiator(s), chain transfer agent(s), organic solvents, and water. In a preferred embodiment of the invention, emulsion polymerization is conducted using three vessels: a monomer staging vessel, an initiator staging vessel, and a reaction vessel. In the monomer staging vessel, a monomer mixture is prepared by mixing ingredients comprising water, a water soluble organic solvent, a pH buffer, a surfactant (preferably non-fluorinated), a fluorinated acrylate monomer of Formula (I), chain transfer agent and a vinyl compound of Formula (II). When delivered, the fluorinated acrylate monomer is typically dissolved in an organic solvent such as acetone and/or alcohol. In the initiator staging vessel, an initiator mixture is prepared by mixing water with a water soluble free radical initiator. The monomer mixture is introduced to the reactor vessel and heated to the reaction temperature (typically from 40-90° C.); after which, the initiator mixture is introduced and the polymerization is conducted. Although the emulsion polymerization process of the invention can involve a single addition of monomer mixture and a single addition of initiator mixture as described above, serial or continuous additions of monomer mixture and initiator mixture are preferred.

Suitable water soluble initiators for use in the emulsion polymerization process of this invention include: inorganic salts of persulfuric acid, such as potassium persulfate, sodium persulfate, and ammonium persulfate; redox initiators, such as persulfate-bisulfite couple, persulfate-hydrosulfite couple; peroxides such as hydrogen peroxide, cumene hydroperoxide, tert-butyl hydroperoxide; and azoic compounds, such as 4,4'-azobis(cyano-4-pentanoic acid). Suitable chain transfer agents for use in the emulsion polymerization process of this invention include: mercaptoethanol, mercaptoacetic acid, stearylmercaptane, tert-dodecylmercaptane, trichloromethane, and the like, and mixtures thereof. Examples of suitable organic co-solvents include: acetates, such as ethyl acetate, butyl acetate, and isopropyl acetate; alcohols, such as 2-methylpropan-2-ol, isopropanol, 2-methoxypropan-2-ol; and ketones, such as acetone, methylisobutyl ketone, and methylethyl ketone; and, such as n-methyl-2-pyrrolidone and the like, and mixtures thereof.

As an alternative to the chain transfer agents mentioned above, fluoropolymers of the invention can be prepared by any known process of controlled polymerization including: Atom Transfer Radical Polymerization (ATRP), Reversible Addition Fragmentation chain Transfer polymerization (RAFT), Iodine Transfer Polymerization (ITP), Reversible Iodine Transfer Polymerization (RITP), Macromolecular Design via the Interchange of Xanthates (MADIX), and Nitroxide Mediated Polymerization (NMP). Of these mechanisms, RAFT and ITP are preferred for use in the invention. Specifically, the RAFT mechanism employs a dithioester group containing compounds, such as 1-(ethoxycarbonyl)eth-1-yl dithiobenzoate), as free radical initiators and is described in U.S. Pat. No. 6,642,318; hereby incorporated by reference to the extent permitted by applicable law. The ITP mechanism employs an iodo containing chain transfer agent, such as perfluorohexyliodine, and is described in U.S. Pat. Nos. 4,158,678; 5,231,154; both of which are hereby incorporated by reference to the extent permitted by applicable law The fluoropolymers of the invention can be applied to leather by well known techniques. Preferred methods of application include core (drum application) or surface (spray application) treatments.

In drum application, leather is placed in a "drum" which typically comprises a cylindrical structure mounted on axles with a sealable door. The axles can be hollow thereby allowing the introduction and removal of a liquid for treatment of the leather. In accordance with the invention, leather is placed in a drum and contacted with a chosen liquid treatment. The drum is sealed then agitated back and forth and/or rotated like a washing machine for a length of time suitable to complete the chosen treatment. The drum may be equipped with internal shelves, pegs, and/or paddle to help improve penetrability.

EXAMPLES

In all the examples, the fluorinated acrylate monomer used was 2-[methyl[(3,3,4,4,5,5,6,6,7,7,8,8,8-tridecafluorooctyl)sulfonyl]amino]ethyl ester of 2-propenoic acid, used as a 80.4 wt. % solution in acetone). In all of the examples, the vinyl compound monomer used was lauryl acrylate. When referring to certain ingredients below the term "CASRN" is used as an acronym for Chemical Abstract Service Registry Number which are assigned in sequential order to unique, new substances identified by Chemical Abstracts Service for inclusion in their database named, the CAS Registry. Application procedures and repellency tests are described below.

Drum Application Procedure #1

The substrate used in this procedure was bovine nubuck with a thickness of 1.8-2.0 mm. The substrate was placed in a drum and subjected to a treatment procedure according to the Table 1 below after which: 1) the resulting treated substrate is dried at room temperature for 7 days at room temperature; 2) then the treated substrate is dried at 60° C. for 4 hours; and 3) then the treated substrate is cooled to room temperature.

TABLE 1

| Step | Treatment solution[1] | Temperature | Time |
|---|---|---|---|
| Wetting back | 600% water | 40° C. | 30 min |
| Neutralization | 600% water | 40° C. | |
| | 1% sodium formate | | 30 min |
| | 0.5% sodium bicarbonate | | 30 min |
| Wash | 600% water | 40° C. | 10 min |
| Fatliquoring/dyeing | 400% water | 50° C. | 60 min |
| | 10% Fatliquor | | |
| | 3% Dyestuff | | |
| Fluoropolymer introduction | 200% water fluoropolymer[2] | 50° C. | 60 min |
| Fixation | 2.2% formic acid[3] | 50° C. | 20 min |
| Rinse | 600% water | 40° C. | 10 min |

[1]Amounts added are weight percent based on the weight of the substrate.
[2]The amount of fluoropolymer added varies and is specified below.
[3]Delivered as 25 wt. % formic acid in water.

Drum Application Procedure #2

The substrate used in this procedure was bovine full grain from wet blue with a thickness of 1.8-2.0 mm. The substrate was placed in a drum and subjected to a treatment procedure according to the Table 2 below after which: 1) the resulting treated substrate is dried at room temperature for 7 days at room temperature; 2) then the treated substrate is dried at 60° C. for 4 hours; and 3) then the treated substrate is cooled to room temperature.

TABLE 2

| Step | Treatment solution[1] | Temperature | Time |
|---|---|---|---|
| Wetting back | 400% water | 40° C. | 30 min |
| Neutralization | 400% water | 40° C. | |
| | 2% sodium formate | | 15 min |
| | 0.5% sodium bicarbonate | | 30 min |
| Wash | 400% water | 40° C. | 5 min |
| Retanning/ Fatliquoring/dyeing | 200% water | 50° C. | |
| | 5% Polymer Tanning agent | | 45 min |
| | 10% Fatliquor | | 45 min |
| | 3% Dyestuff | | |
| Fluoropolymer introduction | 200% water fluoropolymer[2] | 50° C. | 45 min |
| Fixation | 4% formic acid[3] | 50° C. | 20 min |
| Rinse | 400% water | 40° C. | 10 min |

[1]Amounts added are weight percent based on the weight of the substrate.
[2]The amount of fluoropolymer added varies and is specified below.
[3]Delivered as 25 wt. % formic acid in water.

Drum Application Procedure #3

The substrate used in this procedure was lamb from stain with a thickness of 1.8-2.0 mm. The substrate was placed in a drum and subjected to a treatment procedure according to the Table 3 below after which: 1) the resulting treated substrate is dried at room temperature for 7 days at room temperature; 2)

then the treated substrate is dried at 60° C. for 4 hours; and 3) then the treated substrate is cooled to room temperature.

TABLE 3

| Step | Treatment solution[1] | Temperature | Time |
|---|---|---|---|
| Wetting back | 1000% water | 60° C. | 15 min |
| Neutralization | 1000% water | 35° C. | 5 |
|  | 0.5% ammonia[3] |  | 60 min |
|  | 1.5% ammonia[3] |  | 15 min |
| Wash | 1000% water | 35° C. | 10 min |
| Fatliquoring/dyeing | 400% water | 50° C. |  |
|  | 4% fatliquor |  |  |
|  | 3% dyestuff |  | 60 min |
| Fluoropolymer introduction | 400% water fluoropolymer[2] | 50° C. | 60 min |
| Fixation | 2.5% formic acid[4] | 50° C. | 20 min |
| Rinse | 1000% water | 40° C. | 10 min |

[1]Amounts added are weight percent based on the weight of the substrate.
[2]The amount of fluoropolymer added varies and is specified below.
[3]Delivered as 28 wt. % ammonia in water.
[4]Delivered as 25 wt. % formic acid in water.

Drum Application Procedure #4

The substrate used in this procedure was lamb skin from wet blue with a thickness of 1.8-2.0 mm. The substrate was placed in a drum and subjected to a treatment procedure according to the Table 4 below after which: 1) the resulting treated substrate is dried at room temperature for 7 days at room temperature; 2) then the treated substrate is dried at 60° C. for 4 hours; and 3) then the treated substrate is cooled to room temperature.

TABLE 4

| Step | Treatment solution[1] | Temperature | Time |
|---|---|---|---|
| Wetting back | 300% water | 40° C. | 60 min |
|  | 1% oxalic acid |  |  |
| Wash | 1000% water | 35° C. | 5 min |
| Neutralization/ | 100% water | 40° C. |  |
| Retanning | 5% Polymer |  | 60 min |
|  | Tanning agent |  |  |
|  | 2% sodium acetate |  | 30 min |
|  | 0.5% sodium bicarbonate |  | 60 min |
| Wash | 1000% water | 35° C. | 5 min |
| Fatliquoring/dyeing | 150% water | 40° C. |  |
|  | 10% Fatliquor |  |  |
|  | 2% dyestuff |  | 60 min |
|  | 2% formic acid[3] |  | 45 min |
| Wash | 1000% water | 35° C. | 5 min |
| Fluoropolymer introduction | 150% water fluoropolymer[2] | 40° C. | 40 min |
| Fixation | 1% formic acid[3] | 40° C. | 20 min |
| Rinse | 1000% water | 40° C. | 10 min |

[1]Amounts added are weight percent based on the weight of the substrate.
[2]The amount of fluoropolymer added varies and is specified below.
[3]Delivered as 25 wt. % formic acid in water.

Drum Application Procedure #5

The substrate used in this procedure was pig suede from wet blue with a thickness of 0.6-0.8 mm. The substrate was placed in a drum and subjected to a treatment procedure according to the Table 4 below after which: 1) the resulting treated substrate is dried at room temperature for 7 days at room temperature; 2) then the treated substrate is dried at 60° C. for 4 hours; and 3) then the treated substrate is cooled to room temperature.

TABLE 5

| Step | Treatment solution[1] | Temperature | Time |
|---|---|---|---|
| Wetting back | 300% water | 50° C. | 30 min |
| Wash | 300% water | 30° C. | 10 min |
| Neutralization | 200% water | 30° C. |  |
|  | 2% sodium formate |  |  |
|  | 3% sodium bicarbonate |  | 90 min |
| Wash | 300% water | 30° C. | 10 min |
| Dyeing/ | 50% water |  |  |
| Fatliquoring | 1% ammonia[4] |  |  |
|  | 3% dyestuff | 30° C. | 30 min |
|  | 200% water | 60° C. | 10 min |
|  | 15% Fatliquors |  | 90 min |
|  | 2% formic acid[3] |  | 15 min |
|  | 1.5% formic acid[3] |  | 15 min |
| Wash | 300% water | 60° C. | 10 min |
| Fluoropolymer introduction | 200% water fluoropolymer[2] | 50° C. | 10 min |
|  |  |  | 20 min |
| Fixation | 1% formic acid[3] | 50° C. | 20 min |
|  | 3% chromitan B |  | 60 min |
| Rinse | 300% water | 40° C. | 10 min |

[1]Amounts added are weight percent based on the weight of the substrate.
[2]The amount of fluoropolymer added varies and is specified below.
[3]Delivered as 25 wt. % formic acid in water.
[4]Delivered as 28 wt. % ammonia in water.

Spray Application Procedure #1

The substrate used in this procedure was lamb from stain with a thickness of 1.8-2.0 mm. A treatment solution comprising a fluoropolymer diluted in water (as specified in the examples below) was sprayed onto the substrate. The deposit applied on substrate was 150 g/m$^2$ (with an error of about 20 g/m$^2$). The treated substrate was then dried at room temperature for 24 hours and then was dried at 60° C. for 2 hours.

Spray Application Procedure #2

The substrate used in this procedure was lamb from stain with a thickness of 1.8-2.0 mm. A treatment solution comprising a fluoropolymer diluted in isopropyl alcohol or ethyl acetate water (as specified in the examples below) was sprayed onto the substrate. The deposit applied on substrate was 100 g/m$^2$ (with an error of about 10 g/m$^2$). The treated substrate was then dried at room temperature for 24 hours.

Water Repellency Test

Water repellency was measured according to AATCC Test Method 193-2005, except that test solutions 9-12, measuring higher water repellency, were added as shown in Table 1, below. Higher test liquid numbers indicate increased water repellency.

TABLE 6

Compositions of Water Repellency Test Liquids

| Water Repellency Test Liquid Number | De-ionized Water (Vol. %) | Isopropanol (Vol. %) | Surface Tension (mN · m$^{-1}$) |
|---|---|---|---|
| 0 | None (fails 98% water/2% isopropanol) | | |
| 1 | 98 | 2 | 59.00 |
| 2 | 95 | 5 | 49.75 |
| 3 | 90 | 10 | 41.60 |
| 4 | 80 | 20 | 32.50 |
| 5 | 70 | 30 | 27.40 |
| 6 | 60 | 40 | 25.40 |
| 7 | 50 | 50 | 24.50 |
| 8 | 40 | 60 | 24.00 |
| 9* | 30 | 70 | 23.40 |
| 10* | 20 | 80 | 22.70 |
| 11* | 10 | 90 | 21.90 |
| 12* | 0 | 100 | 21.80 |

*Test liquids added to AATCC Test Method 193-2005.

Oil Repellency Test

Oil repellency was measured according to AATCC Test Method 118-2002. Oil Repellency Grades are 0-8. Higher values indicate increased oil repellency.

Example 1

To a double-jacketed 1 liter reactor was added vinyl compound monomer (32.5 g, 0.136 mol), fluorinated acrylate monomer (40.1 g, 0.059 mol), t-butanol (130.0 g, 1.76 mol), and n-dodecyl mercaptan (0.63 g, 3.1 mmol) with stirring. The temperature was raised to 75° C. Oxygen was removed from the reactor by 30 minutes of a nitrogen flow. Azobisisobutyronitrile (0.52 g, 3.16 mmol) was added to the solution. The temperature was maintained for 20 h under nitrogen. The solids content of the final solution was 36.0 wt. % (theoretical value: 35.9 wt. %). This solution was dried by distillation to remove t-butanol at 70° C. and 350 to 20 mbar vacuum (35 to 2 kPa). Ethyl acetate was added in order to obtain an organic solution with a solids content of 45.05 wt. %.

To a 100-mL flask was added water (28.2 g), propylene glycol (3.18 g), SULFRAMIN acid B (Alkylbenzene sulfonic acid, mixture of C10-C13 isomers, CASRN 85536-14-7, Akzo Nobel, 0.38 g), and NOURACID CZ80 (castor oil fatty acid, CASRN 61789-44-4, Akzo Nobel, 0.13 g) at room temperature with stirring. The solution of polymer in ethyl acetate was added drop-by-drop to this aqueous solution under high shear (ULTRATURAX T2, IKA, 8000 rpm) and maintained under shear for 3 min. The dispersion obtained was left under ultrasound (Vibracell, Sonics&Material) for 3 min. Ethyl acetate was removed by distillation at 70° C. under 350 to 180 mbar vacuum (35 to 18 kPa). The solids content of the dispersion was 45.4 wt. % and the fluorine content of the fluoropolymer therein was 22.8 wt. %.

Example 2

Example 1 was repeated except that perfluorohexyliodine (CASRN 355-43-1, PFHI, DuPont, 1.47 g, 3.1 mmol) was used instead of n-dodecyl mercaptan. The product made by Example 2 had a solids content of 31.3 wt. % and the fluorine content of the fluoropolymer therein was 21.8 wt. %.

Example 3

Example 1 was repeated except that 1-(ethoxycarbonyl)eth-1-yl dithiobenzoate (0.79 g instead of n-dodecyl mercaptan. Synthesis of 1-(ethoxycarbonyl)eth-1-yl dithiobenzoate is described in the following reference: Severac R., Lacroix-Desmazes P., Boutevin B., Polymer International, 2005 (51) 1117-1122, hereby incorporated by reference to the extent permitted by applicable law. The product made by Example 3 had a solids content of 37.6 wt. % and the fluorine content of the fluoropolymer therein was 23.0 wt. %.

Repellency Evaluation #1: Examples 1-3

Three pieces were cut from the same sample of bovine nubuck and identified as Bovine Nubuck #1, Bovine Nubuck #2, and Bovine Nubuck #3.

The product made by Example 1 was applied to Bovine Nubuck #1 in accordance with Drum Application Procedure #1 wherein the treatment solution for the fluoropolymer introduction step was made by diluting an aliquot from the product of Example 1 in water, thereby yielding a treatment solution with a fluorine content of 0.33 wt. %. The resulting treated leather substrate was subjected to water and oil repellency tests, the results of which are shown in Table 7.

The product made by Example 2 was applied to Bovine Nubuck #2 in accordance with Drum Application Procedure #1 wherein the treatment solution for the fluoropolymer introduction step was made by diluting an aliquot from the product of Example 2 in water, thereby yielding a treatment solution with a fluorine content of 0.33 wt. %. The resulting treated leather substrate was subjected to water and oil repellency tests, the results of which are shown in Table 7.

The product made by Example 3 was applied to a Bovine Nubuck #3 in accordance with Drum Application Procedure #1 wherein the treatment solution for the fluoropolymer introduction step was made by diluting an aliquot from the product of Example 3 in water, thereby yielding a treatment solution with a fluorine content of 0.33 wt. %. The resulting treated leather substrate was subjected to water and oil repellency tests, the results of which are shown in Table 7.

TABLE 7

| Example # | Chain Transfer Agent Used | Wt. % Fluorine Incorporated in Fluoropolymer | Oil Repellency Rating | Water Repellency Rating |
| --- | --- | --- | --- | --- |
| 1 | n-dodecyl mercaptan | 22.8 | 6 | 12 |
| 2 | perfluorohexyliodine | 21.8 | 6 | 11/12* |
| 3 | 1-(ethoxycarbonyl)eth-1-yl dithiobenzoate | 23.0 | 5 | 10/11* |

*indicates a rating in-between these two numbers

Table 7 shows that various chain transfer agents can be employed to make the fluoropolymers of the invention having approximately the same fluorine incorporation and the same ability to impart repellency.

Comparative Example A

To a double-jacketed 1 liter reactor was added vinyl compound monomer (22.6 g, 0.0923 mol), fluorinated acrylate monomer (28.2 g, 0.042 mol), acrylic acid (19.41 g, 0.269 mol), t-butanol (120.0 g, 1.62 mol), and n-dodecyl mercaptan (0.63 g, 3.1 mmol) with stirring. The temperature was raised to 75° C. Oxygen was removed from the reactor by 30 minutes of a nitrogen flow. Azobisisobutyronitrile (0.52 g, 3.11 mmol) was added to the solution. The temperature was maintained for 20 h under nitrogen. The solids content of the final solution was 35.6 wt. % (theoretical value: 35.9 wt %). This solution was dried by distillation to remove t-butanol at 70° C. and 350 to 20 mbar vacuum (35 to 2 kPa). Ethyl acetate was added in order to obtain an organic solution with a solids content of 44.9 wt. %.

To a 100-mL flask was added water (28.2 g), propylene glycol (3.18 g), SULFRAMIN acid B (Alkylbenzene sulfonic acid, mixture of C10-C13 isomers, CASRN 85536-14-7, Akzo Nobel, 0.38 g), and NOURACID CZ80 (castor oil fatty acid, CASRN 61789-44-4, Akzo Nobel, 0.13 g) at room temperature with stirring. The solution of polymer in ethyl acetate was added drop-by-drop to this aqueous solution under high shear (ULTRATURAX T2, IKA, 8000 rpm) and maintained under shear for 3 min. The dispersion obtained was left under ultrasound (Vibracell, Sonics&Material) for 3 min. Ethyl acetate was removed by distillation at 70° C. under 350 to 180 mbar vacuum (35 to 18 kPa). The solids content of the dispersion was 45.2 wt. % and the fluorine content of the fluoropolymer therein was 16.0 wt. %.

Repellency Evaluation #2: Example 1 versus Comparative Example A

Two pieces were cut from the same sample of bovine nubuck and identified as Bovine Nubuck #4 and Bovine Nubuck #5. It should be noted that the sample of bovine nubuck used in Repellency Evaluation #2 was different from the sample of bovine nubuck used in Repellency Evaluation #1.

The product made by Example 1 was applied to Bovine Nubuck #4 in accordance with Drum Application Procedure #1 wherein the treatment solution for the fluoropolymer introduction step was made by diluting an aliquot from the product of Example 1 in water, thereby yielding a treatment solution with a fluorine content of 0.33 wt. %. The resulting treated leather substrate was subjected to water and oil repellency tests, the results of which are shown in Table 8.

The product made by Comparative Example A was applied to Bovine Nubuck #5 in accordance with Drum Application Procedure #1 wherein the treatment solution for the fluoropolymer introduction step was made by diluting an aliquot from the product of Comparative Example A in water, thereby yielding a treatment solution with a fluorine content of 0.33 wt. %. The resulting treated leather substrate was subjected to water and oil repellency tests, the results of which are shown in Table 8.

Two pieces were cut from the same sample of bovine full grain from wet blue and identified as Bovine Full Grain #1 and Bovine Full Grain #2.

The product made by Example 1 was applied to Bovine Full Grain #1 in accordance with Drum Application Procedure #2 wherein the treatment solution for the fluoropolymer introduction step was made by diluting an aliquot from the product of Example 1 in water, thereby yielding a treatment solution with a fluorine content of 0.17 wt. %. The resulting treated leather substrate was subjected to water and oil repellency tests, the results of which are shown in Table 8.

The product made by Comparative Example A was applied to Bovine Full Grain #2 in accordance with Drum Application Procedure #2 wherein the treatment solution for the fluoropolymer introduction step was made by diluting an aliquot from the product of Comparative Example A in water, thereby yielding a treatment solution with a fluorine content of 0.17 wt. %. The resulting treated leather substrate was subjected to water and oil repellency tests, the results of which are shown in Table 8.

Two pieces were cut from the same sample of lamb skin from wet blue and identified as Lamb Blue #1 and Lamb Blue #2.

The product made by Example 1 was applied to Lamb Blue #1 in accordance with Drum Application Procedure #4 wherein the treatment solution for the fluoropolymer introduction step was made by diluting an aliquot from the product of Example 1 in water, thereby yielding a treatment solution with a fluorine content of 0.22 wt. %. The resulting treated leather substrate was subjected to water and oil repellency tests, the results of which are shown in Table 8.

The product made by Comparative Example A was applied to Lamb Blue #2 in accordance with Drum Application Procedure #4 wherein the treatment solution for the fluoropolymer introduction step was made by diluting an aliquot from the product of Comparative Example A in water, thereby yielding a treatment solution with a fluorine content of 0.22 wt. %. The resulting treated leather substrate was subjected to water and oil repellency tests, the results of which are shown in Table 8.

Two pieces were cut from the same sample of pig suede from wet blue and identified as Pig Suede #1 and Pig Suede #2.

The product made by Example 1 was applied to Pig Suede #1 in accordance with Drum Application Procedure #5 wherein the treatment solution for the fluoropolymer introduction step was made by diluting an aliquot from the product of Example 1 in water, thereby yielding a treatment solution with a fluorine content of 0.17 wt. %. The resulting treated leather substrate was subjected to water and oil repellency tests, the results of which are shown in Table 8.

The product made by Comparative Example A was applied to Pig Suede #2 in accordance with Drum Application Procedure #5 wherein the treatment solution for the fluoropolymer introduction step was made by diluting an aliquot from the product of Comparative Example A in water, thereby yielding a treatment solution with a fluorine content of 0.17 wt. %. The resulting treated leather substrate was subjected to water and oil repellency tests, the results of which are shown in Table 8.

TABLE 8

| Substrate | Example # | Oil Repellency Rating | Water Repellency Rating |
|---|---|---|---|
| bovine nubuck | 1 | 6 | 12 |
|  | A | 0 | 4 |
| bovine full grain from wet blue | 1 | 4 | 8 |
|  | A | 0 | 4 |
| lamb skin from wet blue | 1 | 5 | 10 |
|  | A | 0 | 5 |
| pig suede from wet blue | 1 | 6 | 11 |
|  | A | 0 | 4 |

Table 8 demonstrates that the incorporation of a hydrophilic monomer (acrylic acid) detrimentally affects the ability of a fluoropolymer to impart repellency. A comparison is made of: 1) substrates treated with Example 1, a fluoropolymer without incorporation of acrylic acid; versus 2) substrates treated with Comparative Example A, a fluoropolymer incorporating acrylic acid. This comparison shows that substrates treated by the same process had significantly better repellency to oil and water when treated with a fluoropolymer without incorporation of a hydrophilic monomer (acrylic acid).

Example 4

To a double-jacketed 1 liter reactor was added vinyl compound monomer (18.8 g, 78.1 mmol), fluorinated acrylate monomer (35.1 g, 52.4 mmol), t-butanol (110.2 g, 1.49 mol), and n-dodecyl mercaptan (0.47 g, 2.32 mmol) with stirring. The temperature was raised to 75° C. Oxygen was removed from the reactor by 30 minutes of a nitrogen flow. Azobisisobutyronitrile (0.35 g, 2.15 mmol) was added to the solution. The temperature was maintained for 20 h under nitrogen. The solids content of the final solution was 29.2 wt. % (theoretical value: 28.7 wt. %). This solution was dried by distillation to remove t-butanol at 70° C. and 350 to 20 mbar vacuum (35 to 2 kPa). Ethyl acetate was added in order to obtain an organic solution with a solids content of 45.05 wt. %.

To a 100-mL flask was added water (20.4 g), propylene glycol (2.30 g), SULFRAMIN acid B (Alkylbenzene sulfonic acid, mixture of C10-C13 isomers, CASRN 85536-14-7, Akzo Nobel, 0.27 g), and NOURACID CZ80 (castor oil fatty acid, CASRN 61789-44-4, Akzo Nobel, 0.09 g) at room temperature with stirring. The solution of polymer in ethyl acetate was added drop-by-drop to this aqueous solution under high shear (ULTRATURAX T2, IKA, 8000 rpm) and maintained under shear for 3 min. The dispersion obtained was left under ultrasound (Vibracell, Sonics&Material) for 3 min. Ethyl acetate was removed by distillation at 70° C. under 350 to 180 mbar vacuum (35 to 18 kPa). The solids content of the dispersion was 39.1 wt. % and the fluorine content of the fluoropolymer therein was 27.5 wt %.

Repellency Evaluation #3: Examples 1 and 4

Two pieces were cut from the same sample of bovine nubuck and identified as Bovine Nubuck #6 and Bovine Nubuck #7. It should be noted that the sample of bovine nubuck used in Repellency Evaluation #3 was different from both: the sample of bovine nubuck used in Repellency Evaluation #1; and the sample of bovine nubuck used in Repellency Evaluation #2.

The product made by Example 1 was applied to Bovine Nubuck #6 in accordance with Drum Application Procedure #1 wherein the treatment solution for the fluoropolymer introduction step was made by diluting an aliquot from the product of Example 1 in water, thereby yielding a treatment solution with a fluorine content of 0.33 wt. %. The resulting treated leather substrate was subjected to water and oil repellency tests, the results of which are shown in Table 9.

The product made by Example 4 was applied to Bovine Nubuck #7 in accordance with Drum Application Procedure #1 wherein the treatment solution for the fluoropolymer introduction step was made by diluting an aliquot from the product of Example 8 in water, thereby yielding a treatment solution with a fluorine content of 0.33 wt. %. The resulting treated leather substrate was subjected to water and oil repellency tests, the results of which are shown in Table 9.

Two pieces were cut from the same sample of bovine full grain from wet blue and identified as Bovine Full Grain #3 and Bovine Full Grain #4. It should be noted that the sample of bovine full grain from wet blue used in Repellency Evaluation #3 was different from the sample of bovine full grain from wet blue used in Repellency Evaluation #2.

The product made by Example 1 was applied to Bovine Full Grain #3 in accordance with Drum Application Procedure #2 wherein the treatment solution for the fluoropolymer introduction step was made by diluting an aliquot from the product of Example 1 in water, thereby yielding a treatment solution with a fluorine content of 0.17 wt. %. The resulting treated leather substrate was subjected to water and oil repellency tests, the results of which are shown in Table 9.

The product made by Example 4 was applied to Bovine Full Grain #4 in accordance with Drum Application Procedure #2 wherein the treatment solution for the fluoropolymer introduction step was made by diluting an aliquot from the product of Example 8 in water, thereby yielding a treatment solution with a fluorine content of 0.17 wt. %. The resulting treated leather substrate was subjected to water and oil repellency tests, the results of which are shown in Table 9.

Two pieces were cut from the same sample of lamb from stain and identified as Lamb Stain #1 and Lamb Stain #2.

The product made by Example 1 was applied to Lamb Stain #1 in accordance with Drum Application Procedure #3 wherein the treatment solution for the fluoropolymer introduction step was made by diluting an aliquot from the product of Example 1 in water, thereby yielding a treatment solution with a fluorine content of 0.17 wt. %. The resulting treated leather substrate was subjected to water and oil repellency tests, the results of which are shown in Table 9.

The product made by Example 4 was applied to Lamb Stain #2 in accordance with Drum Application Procedure #3 wherein the treatment solution for the fluoropolymer introduction step was made by diluting an aliquot from the product of Example 8 in water, thereby yielding a treatment solution with a fluorine content of 0.17 wt. %. The resulting treated leather substrate was subjected to water and oil repellency tests, the results of which are shown in Table 9.

Two pieces were cut from the same sample of lamb skin from wet blue and identified as Lamb Blue #3 and Lamb Blue #4. It should be noted that the sample of lamb skin from wet blue used in Repellency Evaluation #3 was different from the sample of lamb skin from wet blue used in Repellency Evaluation #2.

The product made by Example 1 was applied to Lamb Blue #3 in accordance with Drum Application Procedure #4 wherein the treatment solution for the fluoropolymer introduction step was made by diluting an aliquot from the product of Example 1 in water, thereby yielding a treatment solution with a fluorine content of 0.22 wt. %. The resulting treated leather substrate was subjected to water and oil repellency tests, the results of which are shown in Table 9.

The product made by Example 4 was applied to Lamb Blue #4 in accordance with Drum Application Procedure #4 wherein the treatment solution for the fluoropolymer introduction step was made by diluting an aliquot from the product of Example 8 in water, thereby yielding a treatment solution with a fluorine content of 0.22 wt. %. The resulting treated leather substrate was subjected to water and oil repellency tests, the results of which are shown in Table 9.

Two pieces were cut from the same sample of pig suede from wet blue and identified as Pig Suede #3 and Pig Suede #4.

The product made by Example 1 was applied to Pig Suede #3 in accordance with Drum Application Procedure #5 wherein the treatment solution for the fluoropolymer introduction step was made by diluting an aliquot from the product of Example 1 in water, thereby yielding a treatment solution with a fluorine content of 0.17 wt. %. The resulting treated leather substrate was subjected to water and oil repellency tests, the results of which are shown in Table 9.

The product made by Example 4 was applied to Pig Suede #4 in accordance with Drum Application Procedure #5 wherein the treatment solution for the fluoropolymer introduction step was made by diluting an aliquot from the product of Example 8 in water, thereby yielding a treatment solution with a fluorine content of 0.17 wt. %. The resulting treated leather substrate was subjected to water and oil repellency tests, the results of which are shown in Table 9.

TABLE 9

| Substrate | Example # | Oil Repellency Rating | Water Repellency Rating |
|---|---|---|---|
| bovine nubuck | 1 | 5 | 9 |
|  | 4 | 5 | 10 |
| bovine full grain from wet blue | 1 | 3 | 5 |
|  | 4 | 4 | 8 |
| lamb from stain | 1 | 3 | 8/9 |
|  | 4 | 5 | 10 |
| lamb skin from wet blue | 1 | 3 | 5 |
|  | 4 | 4 | 8 |
| pig suede from wet blue | 1 | 4 | 8 |
|  | 4 | 5 | 10 |

This Table shows that fluoropolymers of the invention made from different weight ratios of monomers yield roughly the same repellency performance. The weight ratio of fluorinated acrylate monomer to vinyl compound monomer of Example 1 is 50:50 compared to 60:40 in Example 4. As seen in Table 9, higher proportions of fluorinated acrylate monomer yield higher water repellency ratings.

Example 5

To a double-jacketed 1 liter reactor (reactor vessel) was added water (96.4 g), 1-methoxypropan-2-ol (5.76 g, 6.17×

$10^{-2}$ mol), and n-dodecyl mercaptan (0.78 g, 3.85×10$^{-3}$ mol) with stirring. To a second double jacketed 1 liter reactor (monomer staging vessel) was added vinyl compound monomer (56.5 g, 2.35×10$^{-1}$ mol), fluorinated acrylate monomer (99.5 g, 1.48×10$^{-1}$ mol), water (165.4 g), propan-2-ol (37.8 g, 6.29×10$^{-1}$ mol), disodium tetraborate (0.51 g, 2.53×10$^{-3}$ mol), sodium 1,2-bis(tridecyloxycarbonyl)ethanesulphonate (4.07 g, 6.96×10$^{-3}$ mol), 1-methoxypropan-2-ol (37.58, 4.17×10$^{-1}$ mol) with stirring. Then 25 wt. % of the contents of the monomer staging vessel was loaded into the reactor vessel. After the temperature was stabilized at 85° C., 0.78 g of n-dodecyl mercaptan (3.85×10$^{-3}$ mol) was added to the reactor vessel. A solution of potassium persulfate (0.28 g, 1.04×10$^{-3}$ mol) in water (17.9 g) was loaded to a 25 mL syringe (initiator vessel). Oxygen was removed from the initiator vessel by 30 minutes of a nitrogen flow. To start the polymerization, a solution of potassium persulfate (0.07 g, 2.59×10$^{-4}$ mol) in water (4.48 g) was added into the reactor vessel from the initiator vessel. After minutes, the remaining contents of the monomer staging vessel and the initiator staging vessel were fed over the course of 120 minutes, and then, the temperature was maintained at 85° C. for over 150 minutes. Solvents were removed by a vacuum distillation (reactor vessel pressure: 0.5 bar [50 kPa], reactor vessel temperature from 65° C. to 80° C.). The reactor vessel was cooled down to 30° C. 14.53 g of water was added to the reactor vessel in order to obtain 450.4 g of a product with a solids content of 30.0 wt. % and the fluorine content of the fluoropolymer therein was 27.1 wt. %. The targeted molecular weight of the polymer made in this example was 17,800 grams/mole.

Repellency Evaluation #4: Examples 4 and 5

Seven pieces were cut from the same sample of bovine full grain from wet blue and identified as Bovine Full Grain #5, Bovine Full Grain #6, Bovine Full Grain #7, Bovine Full Grain #8, Bovine Full Grain #9, Bovine Full Grain #10, and Bovine Full Grain #11. It should be noted that the sample of bovine full grain from wet blue used in Repellency Evaluation #4 was different from both: the sample of bovine full grain from wet blue used in Repellency Evaluation #2; and the sample of bovine full grain from wet blue used in Repellency Evaluation #3.

The product made by Example 4 was applied to Bovine Full Grain #5 in accordance with Drum Application Procedure #2 wherein the treatment solution for the fluoropolymer introduction step was made by diluting an aliquot from the product of Example 4 in water, thereby yielding a treatment solution with a fluorine content of 0.17 wt. %. The resulting treated leather substrate was subjected to water and oil repellency tests, the results of which are shown in Table 10.

The product made by Example 5 was applied to Bovine Full Grain #6 in accordance with Drum Application Procedure #2 wherein the treatment solution for the fluoropolymer introduction step was made by diluting an aliquot from the product of Example 5 in water, thereby yielding a treatment solution with a fluorine content of 0.17 wt. %. The resulting treated leather substrate was subjected to water and oil repellency tests, the results of which are shown in Table 10 and Table 11.

TABLE 10

| Example # | Wt. % Fluorine Incorporated in Fluoropolymer | Oil Repellency Rating | Water Repellency Rating |
|---|---|---|---|
| 4 | 27.5 | 4/5* | 10 |
| 5 | 27.1 | 5 | 10 |

*indicates a rating in-between these two numbers

Table 10 compares fluoropolymer compositions of the invention made by two different processes: Example 4, solution polymerization in organic solvent followed by dispersion in water; and Example 5, emulsion polymerization. Table 10 shows that fluoropolymers compositions of the invention can be made by different processes while still achieving substantially the same properties including incorporation of fluorine, oil repellency, and water repellency.

Example 6

Example 5 was repeated except that: 1) the amount of dodecyl mercaptan added toe the reactor vessel was lowered to 0.65 g (3.21×10$^{-3}$ mol), and 2) the amount of dodecyl mercaptan added to the monomer staging vessel was lowered to 0.65 g (3.21×10$^{-3}$ mol). The product made by Example 6 had a solids content of 30.0 wt. % and the fluorine content of the fluoropolymer therein was 27.3 wt. %. The targeted molecular weight of the polymer made in this example was 21,400 grams/mole.

Example 7

Example 5 was repeated except that: 1) the amount of dodecyl mercaptan added toe the reactor vessel was raised to 0.91 g (4.50×10$^{-3}$ mol), and 2) the amount of dodecyl mercaptan added to the monomer staging vessel was raised to 0.91 g (4.50×10$^{-3}$ mol). The product made by Example 7 had a solids content of 30.0 wt. % and the fluorine content of the fluoropolymer therein was 27.3 wt. %. The targeted molecular weight of the polymer made in this example was 15,300 grams/mole.

Example 8

Example 5 was repeated except that: 1) the amount of dodecyl mercaptan added toe the reactor vessel was lowered to 0.06 g (3.21×10$^{-4}$ mol), and 2) the amount of dodecyl mercaptan added to the monomer staging vessel was lowered to 0.06 g (3.21×10$^{-4}$ mol). The product made by Example 8 had a solids content of 30.0 wt. % and the fluorine content of the fluoropolymer therein was 27.5 wt. %. The targeted molecular weight of the polymer made in this example was 106,500 grams/mole.

Repellency Evaluation #5: Examples 5-8

The repellency evaluation of Example 5 was conducted in Repellency Evaluation #4.

The product made by Example 6 was applied to Bovine Full Grain #7 (see Repellency Evaluation #4) in accordance with Drum Application Procedure #2 wherein the treatment solution for the fluoropolymer introduction step was made by diluting an aliquot from the product of Example 6 in water, thereby yielding a treatment solution with a fluorine content of 0.17 wt. %. The resulting treated leather substrate was subjected to water and oil repellency tests, the results of which are shown in Table 11 and Table 12.

The product made by Example 7 was applied to Bovine Full Grain #8 (see Repellency Evaluation #4) in accordance with Drum Application Procedure #2 wherein the treatment solution for the fluoropolymer introduction step was made by diluting an aliquot from the product of Example 7 in water, thereby yielding a treatment solution with a fluorine content of 0.17 wt. %. The resulting treated leather substrate was subjected to water and oil repellency tests, the results of which are shown in Table 11.

The product made by Example 8 was applied to Bovine Full Grain #9 (see Repellency Evaluation #4) in accordance with Drum Application Procedure #2 wherein the treatment solution for the fluoropolymer introduction step was made by diluting an aliquot from the product of Example 8 in water, thereby yielding a treatment solution with a fluorine content of 0.17 wt. %. The resulting treated leather substrate was subjected to water and oil repellency tests, the results of which are shown in Table 11 and Table 12.

TABLE 11

| Example # | Targeted MW grams/mole | nDDM[1] | Wt. % Fluorine Incorporated in Fluoropolymer | Oil Repellency Rating | Water Repellency Rating |
|---|---|---|---|---|---|
| 5 | 17,800 | $8.47 \times 10^{-3}$ | 27.1 | 5 | 10 |
| 6 | 21,400 | $6.42 \times 10^{-3}$ | 27.3 | 5 | 10 |
| 7 | 15,300 | $9.00 \times 10^{-3}$ | 27.3 | 5 | 9/10[2] |
| 8 | 106,500 | $6.42 \times 10^{-4}$ | 27.5 | 4 | 8 |

[1]Total moles of n-dodecyl mercaptan added during polymerization
[2]indicates a rating in-between these two numbers Table 11 shows that the fluoropolymers of the invention can vary by molecular weight and still yield similar repellency ratings. Table 11 also shows that, for drum application, lower molecular weight polymers (such as Examples 10-13) yield improved repellency ratings over higher molecular weight polymers (such as Example 14).

Comparative Example B

Example 6 was repeated except that 5.08 g ($2.41 \times 10^{-2}$ mol) of N-hydroxymethyl acrylamide (CASRN 924-42-5) was also added to the monomer staging vessel. The targeted molecular weight of the polymer made in this example was 22,200 grams/mole. The product of this example had a solids content of 30.0 wt. % and the fluorocopolymer therein had a fluorine content of 27.3 wt. %.

Comparative Example C

Comparative Example B repeated except that: 1) the amount of dodecyl mercaptan added toe the reactor vessel was lowered to 0.06 g ($2.96 \times 10^{-4}$ mol), and 2) the amount of dodecyl mercaptan added to the monomer staging vessel was lowered to 0.06 g ($2.96 \times 10^{-4}$ mol). The targeted molecular weight of the polymer made in this example was 239,300 grams/mole. The product of this example had a solids content of 30.0 wt. % and the fluorocopolymer therein had a fluorine content of 27.0 wt. %.

Repellency Evaluation #6: Examples 6 and 8; Comparative Examples B and C

The repellency evaluation of Examples 6 and 8 was conducted in Repellency Evaluation #5.

The product made by Comparative Example B was applied to Bovine Full Grain #10 (see Repellency Evaluation #4) in accordance with Drum Application Procedure #2 wherein the treatment solution for the fluoropolymer introduction step was made by diluting an aliquot from the product of Comparative Example B in water, thereby yielding a treatment solution with a fluorine content of 0.17 wt. %. The resulting treated leather substrate was subjected to water and oil repellency tests, the results of which are shown in Table 12.

The product made by Comparative Example C was applied to Bovine Full Grain #11 (see Repellency Evaluation #4) in accordance with Drum Application Procedure #2 wherein the treatment solution for the fluoropolymer introduction step was made by diluting an aliquot from the product of Comparative Example C in water, thereby yielding a treatment solution with a fluorine content of 0.17 wt. %. The resulting treated leather substrate was subjected to water and oil repellency tests, the results of which are shown in Table 12.

TABLE 12

| Example # | Targeted MW grams/mole | nDDM* | Wt. % Fluorine Incorporated in Fluoropolymer | Oil Repellency Rating | Water Repellency Rating |
|---|---|---|---|---|---|
| 6 | 21,400 | $3.21 \times 10^{-3}$ | 27.3 | 5 | 10 |
| B | 22,200 | $3.21 \times 10^{-3}$ | 27.3 | 4 | 6 |
| 8 | 106,500 | $6.42 \times 10^{-4}$ | 27.5 | 4 | 8 |
| C | 239,300 | $2.96 \times 10^{-4}$ | 27.0 | 3 | 6 |

*Total moles of n-dodecyl mercaptan added during polymerization

Table 12 demonstrates that the incorporation of a hydrophilic monomer (N-hydroxymethyl acrylamide) detrimentally affects the ability of a fluoropolymer to impart repellency. A first comparison is made of lower molecular weight fluorocopolymers: 1) substrates treated with Example 6, a fluoropolymer without incorporation of N-hydroxymethyl acrylamide; versus 2) substrates treated with Comparative Example B, a fluoropolymer incorporating N-hydroxymethyl acrylamide. A second comparison is made of higher molecular weight fluorocopolymers: 1) substrates treated with Example 8, a fluoropolymer without incorporation of N-hydroxymethyl acrylamide; versus 2) substrates treated with Comparative Example C, a fluoropolymer incorporating N-hydroxymethyl acrylamide. Both first and second comparisons show that, irrespective of molecular weight, substrates treated by the same process had significantly better repellency to oil and water when treated with a fluoropolymer without incorporation of hydrophilic monomer (N-hydroxymethyl acrylamide).

Example 9

To a double-jacketed 1 liter reactor was added vinyl compound monomer (82.5 g, 0.337 mol), fluorinated acrylate monomer (101.1 g, 0.150 mol), t-butanol (271.0 g, 3.66 mol) with stirring. The temperature was raised to 75° C. Oxygen was removed from the reactor by 30 minutes of a nitrogen flow. Azobisisobutyronitrile (1.34 g, 8.03 mmol) was added to the solution. The temperature was maintained for 20 h under nitrogen. The solids content of the final solution was 39.2 wt. % (theoretical value: 38.6 wt. %). This solution was dried by distillation to remove t-butanol at 70° C. and 350 to 20 mbar vacuum (35 to 2 kPa). Ethyl acetate was added in order to obtain an organic solution with a solids content of 45.1 wt. %.

To a 100-mL flask was added water (71.6 g), propylene glycol (8.07 g), SULFRAMIN acid B (Alkylbenzene sulfonic acid, mixture of C10-C13 isomers, CASRN 85536-14-7, Akzo Nobel, 0.96 g), and NOURACID CZ80 (castor oil fatty acid, CASRN 61789-44-4, Akzo Nobel, 0.33 g) at room temperature with stirring. The solution of polymer in ethyl acetate was added drop-by-drop to this aqueous solution under high shear (ULTRATURAX T2, IKA, 8000 rpm) and maintained under shear for 3 min. The dispersion obtained was left under ultrasound (Vibracell, Sonics&Material) for 3 min. Ethyl acetate was removed by distillation at 70° C. under 350 to 180 mbar vacuum (35 to 18 kPa). The solids content of the dispersion was 45.0 wt. % and the fluorine content of the fluoropolymer therein was 22.8 wt. %.

Repellency Evaluation #7: Examples 1, 6, and 9; Comparative Example A

Four pieces were cut from the same sample of lamb skin from wet blue and identified as Lamb Blue #5, Lamb Blue #6, Lamb Blue #7, and Lamb Blue #8.

The product made by Example 1 was applied to Lamb Blue #5 in accordance with Spray Application Procedure #1 wherein the treatment solution was made by diluting an aliquot from the product of Example 1 in water, thereby yielding a treatment solution with a fluorine content of 0.17 wt. %. The resulting treated leather substrate was subjected to water and oil repellency tests, the results of which are shown in Table 13.

The product made by Example 6 was applied to Lamb Blue #6 in accordance with Spray Application Procedure #1 wherein the treatment solution was made by diluting an aliquot from the product of Example 6 in water, thereby yielding a treatment solution with a fluorine content of 0.17 wt. %. The resulting treated leather substrate was subjected to water and oil repellency tests, the results of which are shown in Table 13.

The product made by Example 9 was applied to Lamb Blue #7 in accordance with Spray Application Procedure #1 wherein the treatment was made by diluting an aliquot from the product of Example 9 in water, thereby yielding a treatment solution with a fluorine content of 0.17 wt. %. The resulting treated leather substrate was subjected to water and oil repellency tests, the results of which are shown in Table 13.

The product made by Comparative Example A was applied to Lamb Blue #8 in accordance with Spray Application Procedure #1 wherein the treatment was made by diluting an aliquot from the product of Example 9 in water, thereby yielding a treatment solution with a fluorine content of 0.17 wt. %. The resulting treated leather substrate was subjected to water and oil repellency tests, the results of which are shown in Table 13.

TABLE 13

| Example # | Wt. % Fluorine Incorporated in Fluoropolymer | Oil Repellency Rating | Water Repellency Rating |
|---|---|---|---|
| 1 | 22.8 | 4 | 9 |
| 6 | 27.3 | 5 | 9 |
| 9 | 22.8 | 5 | 9 |
| A | 16.0 | 0 | 4 |

Table 13 demonstrates that the incorporation of a hydrophilic monomer (acrylic acid) detrimentally affects the ability of a fluoropolymer to impart repellency. Significantly higher oil and water repellency is seen for substrates treated with fluoropolymers that do not incorporate a hydrophilic monomer (Examples 1, 6, and 9) when compared to substrates treated with a fluorocopolymer incorporating a hydrophilic monomer (acrylic acid).

Example 10

To a double-jacketed 2 liter reactor was added vinyl compound monomer (298.5 g, 1.24 mol), fluorinated acrylate monomer (411.9 g, 0.6 mol), t-butanol (1081.0 g, 12.3 mol) with stirring. The temperature was raised to 75° C. Oxygen was removed from the reactor by 30 minutes of a nitrogen flow. Azobisisobutyronitrile (4.96 g, 29.7 mmol) was added to the solution. The temperature was maintained for 20 h under nitrogen. The solids content of the final solution was 35.7 wt. % (theoretical value: 34.9 wt. %). This solution was dried by distillation to remove t-butanol at 70° C. and 350 to 20 mbar vacuum (35 to 2 kPa). Ethyl acetate was added in order to obtain an organic solution with a solids content of 45.10 wt. %. The fluoropolymer in this example had a fluorine content of 22.8 wt. %.

Example 11

To a double-jacketed 1 liter reactor was added vinyl compound monomer (32.5 g, 0.136 mol), fluorinated acrylate monomer (40.1 g, 0.059 mol), t-butanol (130.0 g, 1.76 mol), and n-dodecyl mercaptan (0.63 g, 3.1 mmol) with stirring. The temperature was raised to 75° C. Oxygen was removed from the reactor by 30 minutes of a nitrogen flow. Azobisisobutyronitrile (0.52 g, 3.16 mmol) was added to the solution. The temperature was maintained for 20 h under nitrogen. The solids content of the final solution was 36.0 wt. % (theoretical value: 35.9 wt. %). This solution was dried by distillation to remove t-butanol at 70° C. and 350 to 20 mbar vacuum (35 to 2 kPa). Ethyl acetate was added in order to obtain an organic solution with a solids content of 45.05 wt. %. The targeted molecular weight of this example was 21,100 grams/mole The fluoropolymer in this example had a fluorine content of 22.8 wt. %.

Comparative Example D

To a double-jacketed 1 liter reactor was added vinyl compound monomer (22.6 g, 0.0923 mol), fluorinated acrylate monomer (28.2 g, 0.419 mol), acrylic acid (19.41 g, 0.269 mol), t-butanol (120.0 g, 1.62 mol), and n-dodecyl mercaptan (0.63 g, 3.1 mmol) with stirring. The temperature was raised to 75° C. Oxygen was removed from the reactor by 30 minutes of a nitrogen flow. Azobisisobutyronitrile (0.52 g, 3.11 mmol) was added to the solution. The temperature was maintained for 20 h under nitrogen. The solids content of the final solution was 35.6% (theoretical value: 35.9%). This solution was dried by distillation to remove t-butanol at 70° C. and 350 to 20 mbar vacuum (35 to 2 kPa). Ethyl acetate was added in order to obtain an organic solution with a solids content of 44.9%. The targeted molecular weight of this example was 14,800 grams/mole. The fluoropolymer in this example had a fluorine content of 16.0 wt. %.

Repellency Evaluation #8: Examples 10 and 11; Comparative Example D

Three pieces were cut from the same sample of lamb skin from wet blue and identified as Lamb Blue #9, Lamb Blue #10, and Lamb Blue #11.

The product made by Example 10 was applied to Lamb Blue #9 in accordance with Spray Application Procedure #2 wherein the treatment solution was made by diluting an aliquot from the product of Example 10 in isopropyl alcohol thereby yielding a treatment solution with a fluorine content of 0.09 wt. %. The resulting treated leather substrate was subjected to water and oil repellency tests, the results of which are shown in Table 14.

The product made by Example 11 was applied to Lamb Blue #10 in accordance with Spray Application Procedure #2 wherein the treatment solution was made by diluting an aliquot from the product of Example 11 in isopropyl alcohol thereby yielding a treatment solution with a fluorine content of 0.09 wt. %. The resulting treated leather substrate was subjected to water and oil repellency tests, the results of which are shown in Table 14.

The product made by Comparative Example D was applied to Lamb Blue #11 in accordance with Spray Application Procedure #2 wherein the treatment solution was made by diluting an aliquot from the product of Comparative Example D in isopropyl alcohol thereby yielding a treatment solution with a fluorine content of 0.09 wt. %. The resulting treated leather substrate was subjected to water and oil repellency tests, the results of which are shown in Table 14.

TABLE 14

| Example # | Targeted MW grams/mole | Wt. % Fluorine Incorporated in Fluoropolymer | Oil Repellency Rating | Water Repellency Rating |
|---|---|---|---|---|
| 10 | * | 22.8 | 7 | 12 |
| 11 | 21,100 | 22.8 | 4 | 10 |
| D | 14,800 | 16.0 | 5 | 5 |

* No chain transfer agent was used therefore there is no targeted molecular weight but it is assumed to be higher than Example 11 and Comparative Example D.

Table 14 demonstrates that the incorporation of a hydrophilic monomer (acrylic acid) detrimentally affects the ability of a fluoropolymer to impart repellency. Significantly higher oil and water repellency is seen for substrates treated with fluoropolymers that do not incorporate a hydrophilic monomer (Examples 10 and 11) when compared to substrates treated with a fluorocopolymer incorporating a hydrophilic monomer (acrylic acid). Comparing Example 10 to Example 11 shows that a fluorocopolymer made without a chain transfer agent imparts higher oil and water repellency when sprayed in a homogenous organic medium.

What is claimed is:

1. A fluoropolymer comprising at least 20 weight percent of hydrophobic fluorinated acrylic units, at least 35 weight percent of hydrophobic vinylic units, and optionally other monomeric units, provided that no more than 10 weight percent of any hydrophobic monomeric units other than said hydrophobic fluorinated acrylic units and said hydrophobic vinylic units are present and no more than 5 weight percent of any hydrophilic monomeric units are present, said fluoropolymer imparting repellency to leather contacted therewith, and represented by the following:

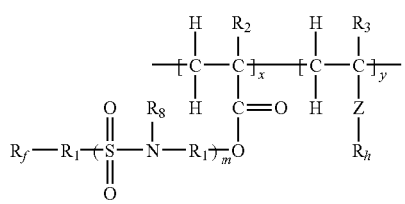

wherein x is a non-zero positive integer denoting the number of hydrophobic fluorinated acrylic units; y is a non-zero positive integer denoting the number of hydrophobic vinylic units; the sum of x and y is at least 21 and the ratio of x:y is from 2:8 to 6:4; each $R_f$ independently represents a perfluorinated alkyl group, optionally interrupted by oxygen, having 2 to 6 carbon atoms; each $R_1$ is independently chosen from a $C_1$-$C_{20}$ hydrocarbylene; each $R_8$ is independently chosen from a $C_1$-$C_{20}$ hydrocarbyl or hydrogen; each $R_2$ is independently chosen from hydrogen, fluorine, or a $C_1$-$C_4$ alkyl; each m is independently 1; each $R_h$ independently represents a linear or branched hydrocarbon group having at least 4 carbon atoms; each Z is divalent and independently selected from the group consisting of —OC(O)—, —HNC(O)—, and —$C_6H_4$—; and each $R_3$ is independently chosen from hydrogen or a $C_1$-$C_4$ alkyl group.

2. The fluoropolymer of claim 1 wherein $R_1$ is a linear $C_1$-$C_5$ hydrocarbylene; $R_8$ is chosen from linear $C_1$-$C_5$ hydrocarbyl or hydrogen; and $R_2$ and $R_3$ is chosen from hydrogen or methyl.

3. The fluoropolymer of claim 1 wherein Z is —OC(O)—.

4. The fluoropolymer of claim 1 having a molecular weight of at least 10,000 grams/mole.

5. The fluoropolymer of claim 1 in an organic solvent, an aqueous dispersion, or an aqueous emulsion.

6. A method for imparting water and/or oil repellency to leather, the method comprising contacting a leather substrate with the fluoropolymer of claim 1.

7. The method of claim 6 wherein the contacting is by core or surface treatment.

* * * * *